(12) United States Patent
Takayama et al.

(10) Patent No.: US 9,065,301 B2
(45) Date of Patent: Jun. 23, 2015

(54) POWER CONTROL SYSTEM AND ELECTRIC DEVICE

(75) Inventors: Hisashi Takayama, Osaka (JP); Izumi Usuki, Osaka (JP); Kiyotaka Takehara, Nara (JP); Akiko Takamiya, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 568 days.

(21) Appl. No.: 13/395,200

(22) PCT Filed: Aug. 30, 2010

(86) PCT No.: PCT/IB2010/002115
§ 371 (c)(1),
(2), (4) Date: Apr. 26, 2012

(87) PCT Pub. No.: WO2011/030195
PCT Pub. Date: Mar. 17, 2011

(65) Prior Publication Data
US 2012/0203387 A1 Aug. 9, 2012

(30) Foreign Application Priority Data
Sep. 10, 2009 (JP) ................................. 2009-209639

(51) Int. Cl.
| G05D 11/00 | (2006.01) |
| H02J 3/38 | (2006.01) |
| H01M 10/44 | (2006.01) |

(Continued)

(52) U.S. Cl.
CPC ............. *H02J 3/383* (2013.01); *H01M 10/441* (2013.01); *H01M 14/00* (2013.01); *H01M 16/00* (2013.01); *H02J 3/14* (2013.01); *H02J 7/35* (2013.01); *Y02B 10/14* (2013.01); *Y02E 10/563* (2013.01); *Y02E 10/566* (2013.01)

(58) Field of Classification Search
USPC ................................. 700/291; 361/62; 702/61
See application file for complete search history.

(56) References Cited

U.S. PATENT DOCUMENTS

| 5,835,383 | A | 11/1998 | Onizuka et al. |
| 7,489,988 | B2 | 2/2009 | Matsui et al. |

(Continued)

FOREIGN PATENT DOCUMENTS

| CN | 1163499 | 10/1997 |
| CN | 1619941 A | 5/2005 |

(Continued)

OTHER PUBLICATIONS

The International Search Report.

(Continued)

*Primary Examiner* — Robert Fennema
*Assistant Examiner* — Anthony Whittington
(74) *Attorney, Agent, or Firm* — Bacon & Thomas, PLLC

(57) ABSTRACT

A power control system controls electric devices so as to consume a power generated by a self-generated power facility using a natural energy, which is provided with a surplus power detection unit that detects the surplus portion of power generated by the self-generated power facility, and a device control unit that controls the operation of a plurality of electric devices. When the surplus power detection unit detects the surplus power, the device control unit controls one or more of a plurality of electric devices to perform predetermined operations so as to consume the surplus power.

6 Claims, 8 Drawing Sheets

(51) Int. Cl.
  *H01M 14/00* (2006.01)
  *H01M 16/00* (2006.01)
  *H02J 3/14* (2006.01)
  *H02J 7/35* (2006.01)

(56) References Cited

U.S. PATENT DOCUMENTS

| | | | |
|---|---|---|---|
| 2005/0107892 A1* | 5/2005 | Matsui et al. | 700/28 |
| 2005/0141154 A1* | 6/2005 | Consadori et al. | 361/62 |
| 2005/0143865 A1* | 6/2005 | Gardner | 700/291 |
| 2005/0222784 A1* | 10/2005 | Tuff et al. | 702/61 |
| 2009/0154148 A1* | 6/2009 | Meyer et al. | 362/157 |
| 2009/0198384 A1* | 8/2009 | Ahn | 700/292 |

FOREIGN PATENT DOCUMENTS

| | | |
|---|---|---|
| JP | 2005253202 | 9/2005 |
| JP | 2006158148 | 6/2006 |
| JP | 2006311676 | 11/2006 |
| JP | 2009131045 | 6/2009 |

OTHER PUBLICATIONS

An English translation of the Search Report of the Chinese Office Action dated Dec. 23, 2013 issued in corresponding Chinese application No. 201080040164.7.

The English translation of the Search Report of the Chinese Office Action issued on Aug. 18, 2014 in a corresponding Chinese application No. 201080040164.7.

* cited by examiner

POWER CONTROL SYSTEM AND ELECTRIC DEVICE

FIELD OF THE INVENTION

The present invention relates to a power control system and an electric device, the power control system controlling the electric device to consume a power generated by a self-generated electrical power facility using a natural energy.

BACKGROUND OF THE INVENTION

Previously, a self-generated electrical power facility using a natural energy, such as a photovoltaic power system, a wind power system or the like has been configured such that a generated surplus power is reversely supplied (sold) to an electric power system, or is accumulated in a storage battery to be discharged from the storage battery when the demand for power becomes greater than the amount of power generated (for example, see Japanese Patent Application Publication No. 2006-311676).

However, when a surplus power from a self-generated electrical power facility, such as a photovoltaic power system or the like, exceeds even the demand for power selling and the charge capacity of the storage battery, the relevant surplus power has to be inevitably discarded and then wasted.

SUMMARY OF THE INVENTION

Therefore, the present invention provides a power control system and an electric device capable of efficiently consuming a surplus portion of a power from a self-generated electrical power facility, such as a photovoltaic power system and the like.

In accordance with an aspect of the present invention, there is provided a power control system configured to control electric devices to consume a power generated by a self-generated electrical power facility using a natural energy. The power control system includes: a surplus power detection unit for detecting a surplus power generated by the self-generated electrical power facility; and an appliance control unit for controlling operations of the electric devices. The appliance control unit performs a control such that when the surplus power detection unit detects the surplus power, one or more of the electric devices respectively execute predetermined operations and consume the surplus power.

In accordance with this configuration, there can be provided a power control system in which surplus power is consumed by causing one or more electric devices to execute predetermined operations, thus enabling a surplus portion of power from a self-generated electrical power facility, such as a photovoltaic power system, to be efficiently consumed.

The electric devices may include one or more chargeable electric devices, each having a secondary cell as a power source, and, when the surplus power detection unit detects the surplus power, the appliance control unit may perform a control such that the surplus power is supplied to the chargeable electric devices and each of the chargeable electric devices executes a charging operation.

In accordance with this configuration, the secondary cell of a chargeable electric device is charged using surplus power, thus enabling the surplus power to be efficiently consumed.

The power control system may further include an appliance information storage unit for storing information on predetermined operations that are executed by electric devices in power usage candidates for the surplus power. When the surplus power detection unit detects the surplus power, the appliance control unit may perform a control such that a combination of electric devices which efficiently consumes the surplus power is selected among the power usage candidates on the basis of the information on the predetermined operations stored in the appliance information storage unit, and the selected electric devices may consume the surplus power by executing the respective predetermined operations.

In accordance with this configuration, even if the amount of surplus power is greater than the amount of power consumed by each individual electric device, a combination of electric devices having power consumption, the sum of which does not exceed the amount of surplus power, is selected from the power usage candidates, and the selected electric devices execute predetermined operations, thus more efficiently using the surplus power without any waste of power.

The power control system further includes a surplus power prediction unit for predicting a time at which the surplus power is generated and an amount of the surplus power, based on an amount of a power generated by the self-generated electrical power facility and a demand for the power.

The appliance information storage unit stores information on times taken to activate the electric devices in the power usage candidates for the surplus power, together with the information on the predetermined operations. The appliance control unit the surplus power among the power usage candidates, based on the amount of the surplus power predicted by the surplus power prediction unit, the information on the predetermined operations stored in the appliance information storage unit, and the information on the times taken to activate the electric devices, thus activating the selected electric devices before the surplus power generation time predicted by the surplus power prediction unit, and enables the surplus power to be supplied to the selected electric devices when the surplus power detection unit detects the surplus power to allow the electric devices to execute the predetermined operations.

In accordance with this configuration, the time of the generation of surplus power and the amount of the surplus power are predicted, so that electric devices are previously activated correspondingly to the timing at which the surplus power is generated, thus more efficiently using the surplus power.

In accordance with another aspect of the present invention, there is provided an electric device configured to consume a power generated by a self-generated electrical power facility using a natural energy. The electric device includes: an execution unit for executing a predetermined operation upon power supply; a control unit for controlling the execution unit; and a surplus power detection unit for detecting a surplus power from the self-generated electrical power facility. When the surplus power detection unit detects the surplus power, the control unit controls the execution unit to consume the surplus power by executing the predetermined operation.

In accordance with this configuration, there can be provided an electric device that consumes surplus power by causing the execution unit to execute predetermined operations, thereby enabling a surplus portion of power from a self-generated electrical power facility, such as a photovoltaic power system, to be efficiently consumed.

The execution unit may be a secondary cell, and, when the surplus power detection unit detects the surplus power, the control unit preferably controls the surplus power to be supplied to charge the secondary cell.

In accordance with this configuration, the secondary cell is charged using surplus power, thus enabling the surplus power to be efficiently consumed.

BRIEF DESCRIPTION OF THE DRAWINGS

The objects and features of the present invention will be apparent from the following description of preferred embodiments which is given in conjunction with the accompanying drawings.

DETAILED DESCRIPTION OF THE PREFERRED EMBODIMENTS

Embodiments of the present invention will be described in detail below with reference to the accompanying drawings which form a part hereof. Identical or similar parts throughout the drawings will be designated by like reference symbols and redundant description thereof will be omitted.

First Embodiment

Figure 1:
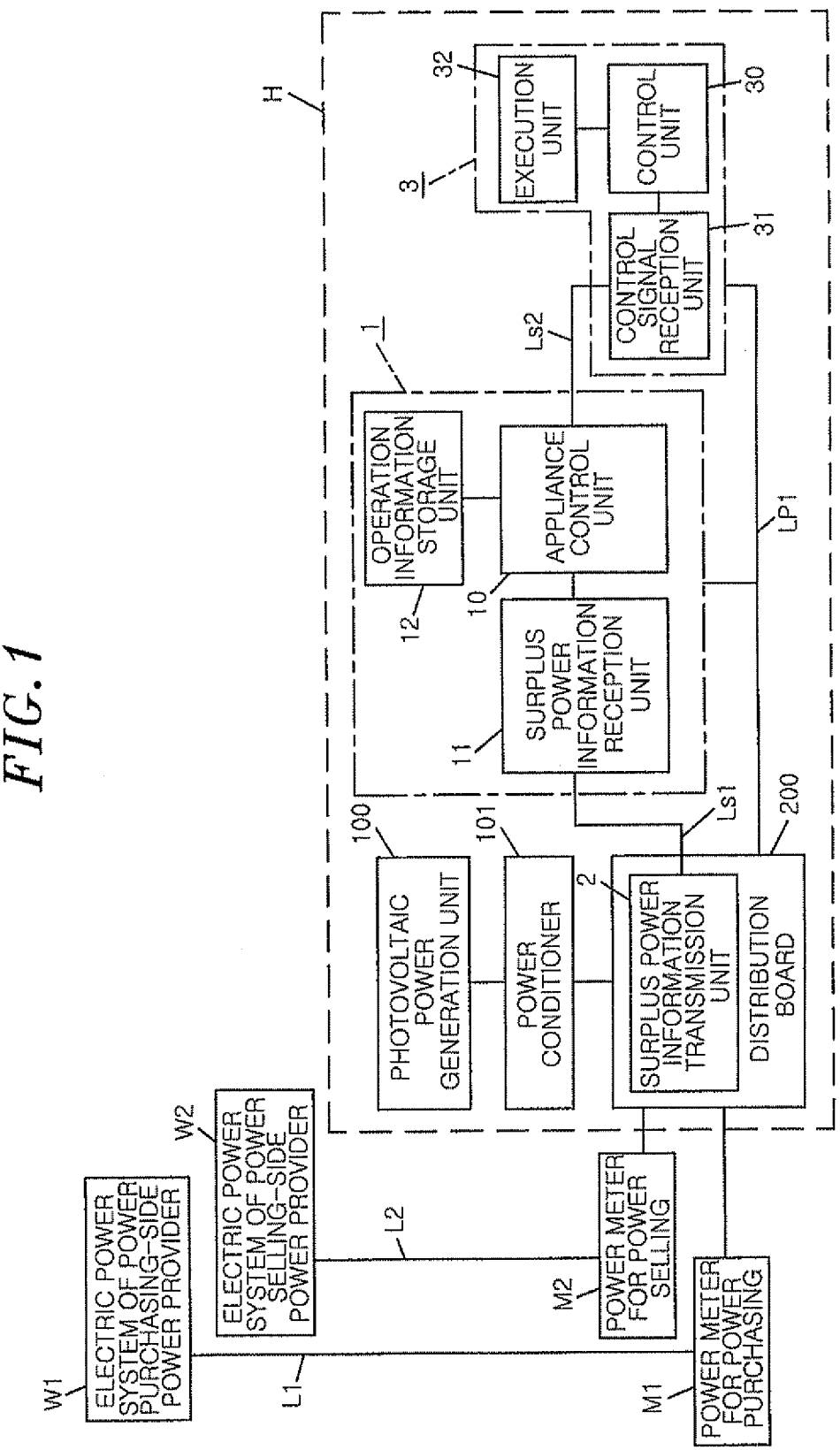
FIG. 1 is a system configuration diagram showing a power control system in accordance with a first embodiment of the present invention.

A system configuration diagram of a power control system in accordance with a first embodiment of the present invention is shown in FIG. 1. The power control system includes an appliance control device 1 and a surplus power information transmission unit 2. The power control system in accordance with the present embodiment is provided in a house H into which a power line L1 and a power line L2 are respectively led through a power meter M1 for power purchasing and a power meter M2 for power selling. The power line L1 is connected to an electric power system W1 of a purchasing-side power provider and the power line L2 is connected to an electric power system W2 of a power selling-side power provider.

A power (AC power) supplied from the electric power system W1 of the power-purchasing side power provider via the power meter M1 for power purchasing is branched and distributed to a distribution board 200 installed in the house H and is fed to an electric device (hereinafter referred to as an "appliance") 3. Further, the distribution board 200 includes weekly breakers, quarter breakers or the like for the electric power system W1 and the electric power system W2.

In the house H, a self-generated electrical power facility using a natural energy, such as a wind power or solar light, is installed. In the present embodiment, e.g., a photovoltaic power system is installed. The photovoltaic power system includes a photovoltaic power generation unit 100 including a plurality of solar cells and a power conditioner 101. The power conditioner 101, which is implemented with a conventionally well-known component, includes an inverter (not shown) for converting a DC power outputted from the photovoltaic power generation unit 100 into an AC power, or includes, in addition to the inverter, a grid-connected protection device (not shown) disposed between the inverter and the electric power systems W1 and W2.

In this case, the power conditioner 101 is configured such that when the inverter converts a DC voltage outputted from the photovoltaic power generation unit 100 into an AC voltage, the output voltage (AC voltage) is adjusted to be slightly higher than the system voltage of the electric power system W2 of the power selling-side power provider, thus selling (reversely supplying) the AC power to the relevant electric power system W2.

However, in the electric power system W2 of the power selling-side power provider, when the system voltage increases and exceeds a predetermined upper limit due to a reduced demand for power (e.g., the stoppage of the use by a large consumer, such as a plant), the power conditioner 101 suppresses the rise in the output voltage of the inverter so that the output voltage does not exceed the upper limit, thus stopping the power from being sold (reversely supplied) to the electric power system W2. Further, such a function of the power conditioner 101 is generally called a "voltage rise suppression function."

In the distribution board 200, there is installed the surplus power information transmission unit 2 which detects a surplus portion of a power generated by the self-generated electrical power facility (photovoltaic power system) and transmits surplus power information (information indicating that the surplus portion of the power has been generated, hereinafter, the same as the above) via a transmission line Ls1. The surplus power information transmission unit 2 monitors the voltage of the primary side of the power meter M2 for power selling (i.e., the side of the distribution board 200) and the output voltage of the power conditioner 101. When the voltage of the primary side is higher than the upper limit and the output voltage of the power conditioner 101 is lower than the voltage of the primary side, the surplus power information transmission unit 2 determines that the voltage rise suppression function of the power conditioner 101 has been fulfilled to stop the selling of power (reverse power supply) to the electric power system W2 of the power selling-side power provider.

In other words, it is determined that surplus power has been generated, and therefore, the surplus power information transmission unit 2 transmits surplus power information. That is, in the present embodiment, the surplus power information transmission unit 2 functions as a surplus power detection means.

The surplus power information transmitted from the surplus power information transmission unit 2 via the transmission line Ls1 is received by the surplus power information reception unit 11 in the appliance control device 1 that controls the operations of one or more electric devices 3. The appliance control device 1 includes an appliance control unit 10 having a microcomputer as its principal component, and an operation information storage unit 12 implemented as rewritable non-volatile semiconductor memory, such as a flash memory, in addition to the surplus power information reception unit 11.

The appliance control unit 10 receives the surplus power information from the surplus power information reception unit 11, and controls the operation of the appliance 3 by outputting a control signal to the appliance 3 on the basis of the surplus power information and the operation information retained (stored) in the operation information storage unit 12.

In this case, the operation information retained in the operation information storage unit 12 refers to information required to control appliance 3 to be controlled. In detail, the operation information denotes information, such as commands for allowing the appliance 3 to start or stop a predetermined operation, and the amount of power consumed when the relevant operation is executed.

Further, the term "predetermined operation" may be, e.g., a defrosting operation or an ice-making operation when the appliance 3 is a refrigerator, or may be a cooling or heating operation performed so that room temperature is kept at a set temperature or an operation of cleaning an internal filter or an internal fan when the appliance 3 is air-conditioning equipment (air conditioner). The "predetermined operation" further may be an operation of purifying air within the room or an operation of cleaning an internal filter or the like when the appliance 3 is an air cleaner, or may be an error checking operation or a defragmentation operation performed on a storage device, such as a hard disk device, when the appliance 3 is a personal computer.

Moreover, the appliance control unit 10 transmits the control signal including a command required to start or stop the predetermined operation to the appliance 3 via the transmission line Ls2.

The appliance 3 includes a control signal reception unit 31 for receiving the control signal transmitted from the appliance control unit 10 via the transmission line Ls2, an execution unit 32 for executing the predetermined operation described above, and a control unit 30 for controlling the execution of the predetermined operation by the execution unit 32 in compliance with the command included in the control signal received by the control signal reception unit 31. Further, the execution unit 32 executes the predetermined operation by using (consuming) a power (AC power) supplied through a power line Lp1 branched at the distribution board 200. However, it is apparent that the power consumed by the appliance 3 also includes powers used (consumed) by the control signal reception unit 31 and the control unit 30, as well as the power used by the execution unit 32. Here, a media forming the transmission lines Ls1 and Ls2 may be dedicated signal lines or electric waves. Alternatively, the media may be implemented by using Power Line Carrier (PLC) communications that allow control signals to be overlapped therewith to be transmitted through the power line Lp1.

The power control system in accordance with the present embodiment basically feeds a power generated by the photovoltaic power generation unit 100 to the appliance 3 (but these also include appliances other than a target of the control of the appliance control device 1) via the distribution board 200 while selling (reversely supply) a surplus portion of the generated power, which exceeds the power consumed by the appliance 3, to the electric power system W2 of the power selling-side power provider. Further, when the power consumed by the appliance 3 exceeds the amount of power generated by the photovoltaic power generation unit 100, the power control system feeds the power supplied (purchased) from the electric power system W1 of the power purchasing-side power provider to the appliance 3 via the distribution board 200 (i.e., a so-called grid-connected operation is executed). Further, although only one target appliance 3 to be controlled is shown in FIG. 1, it is possible that a plurality of target appliances 3 to be controlled may be provided, and the illustration of appliances other than the targets to be controlled is omitted.

Figure 2:
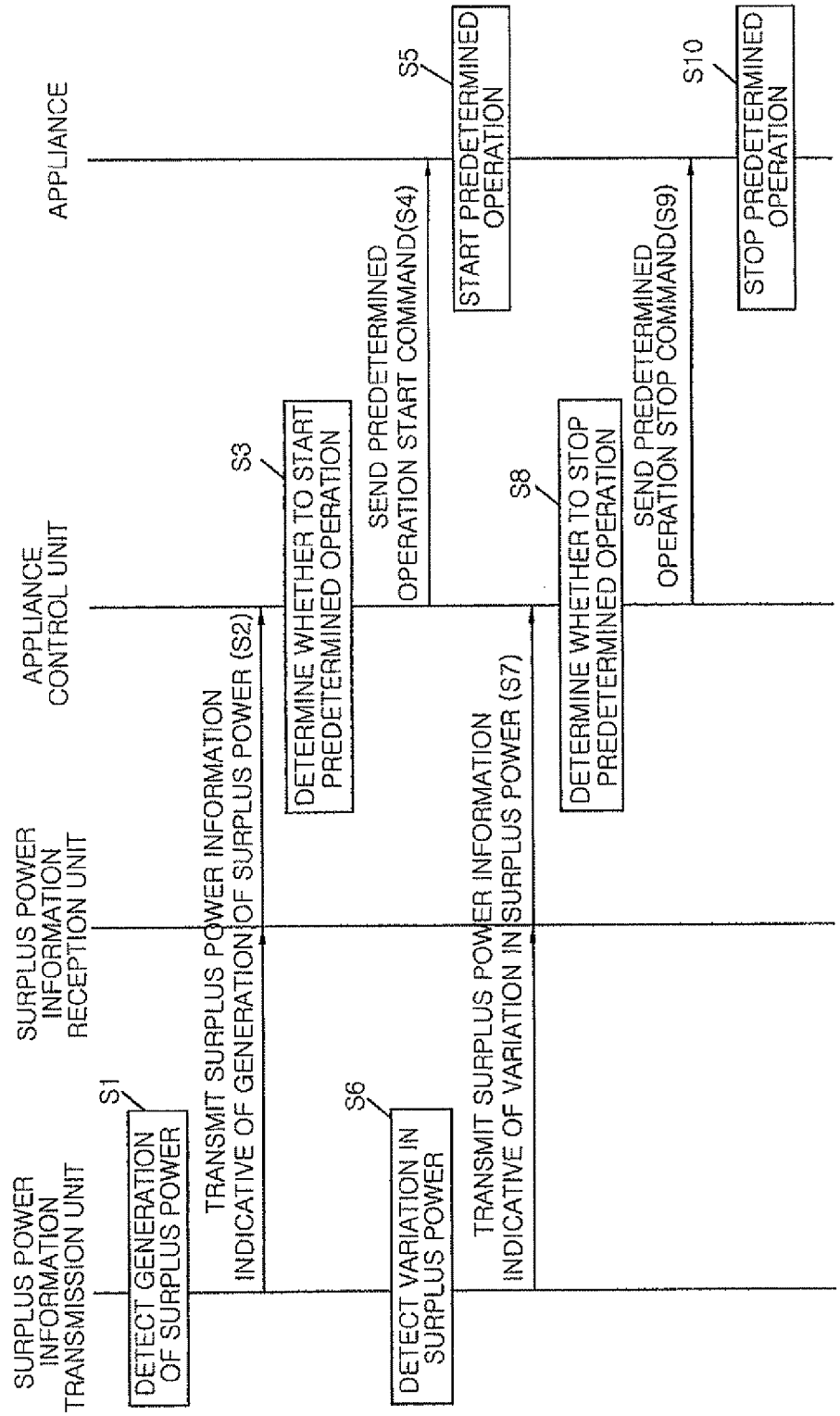
FIG. 2 is a sequence diagram showing an operation of the above power control system.

Next, the operation of the power control system in accordance with the present embodiment will be described with reference to the sequence diagram of FIG. 2.

First, when detecting the generation of a surplus power in step S1, the surplus power information transmission unit 2 transmits surplus power information to the appliance control device 1 via the transmission line Ls1 in step S2. Herein, the surplus power information also includes information indicative of the amount of the surplus power.

The appliance control device 1 receives the surplus power information transmitted via the transmission line Ls1 by the surplus power information reception unit 11 and transfers the surplus power information to the appliance control unit 10. The appliance control unit 10 determines whether to start a predetermined operation of the appliance 3 on the basis of information on the amount of the surplus power, included in the surplus power information, and information on the power consumption of the appliance 3, included in the operation information retained in the operation information storage unit 12, in step S3.

In detail, the appliance control unit 10 determines that the start of the predetermined operation is possible if the amount of surplus power is greater than the power consumption of the appliance 3, or determines that the start of the predetermined operation is impossible if the amount of the surplus power is less than the power consumption thereof. If it is determined that the start is possible, the appliance control unit 10 reads a command for an operation start request stored in the operation information storage unit 12 and transmits a control signal including the command to the appliance 3 via the transmission line Ls2 in step S4. In contrast, if it is determined that the start is impossible, the appliance control unit 10 stops subsequent processes.

Then, the appliance 3 receives the control signal transmitted via the transmission line Ls2 by the control signal reception unit 31, and transfers the command included in the control signal to the control unit 30. The control unit 30 controls the execution unit 32 in compliance with the command and allows the execution unit 32 to execute the predetermined operation in step S5. In this way, the surplus portion of the power (surplus power) generated by the photovoltaic power generation unit 100 is consumed by the appliance 3 which executes the predetermined operation.

In this case, the surplus power varies depending on the amount of power generated by the photovoltaic power generation unit 100 and the power demand of the electric power system W2. Accordingly, when detecting that a variation amount of the surplus power has reached a predetermined amount, on the basis of a comparison between the voltage of the primary side and the output voltage of the power conditioner 101 in step S6, the surplus power information transmission unit 2 transmits the surplus power information indicative of the variation in surplus power to the appliance control device 1 via the transmission line Ls1 in step S7. In this case, the surplus power information includes information on the amount of surplus power that remains after having been varied.

The appliance control device 1 receives the surplus power information transmitted via the transmission line Ls1 by the surplus power information reception unit 11, and transfers the surplus power information to the appliance control unit 10. The appliance control unit 10 determines whether to stop the predetermined operation of the appliance 3 on the basis of both information on the amount of the surplus power, which remains after the variation of the surplus power, included in the surplus power information, and information on the power consumption of the appliance 3 included in the operation information retained in the operation information storage unit 12 in step S8.

In detail, the appliance control unit 10 determines not to stop the predetermined operation if the amount of the surplus power that remains after the variation of the surplus power is greater than the power consumption of the appliance 3, or determines to stop the predetermined operation if the amount of the surplus power that remains after the variation of the surplus power is less than the power consumption thereof. If it is determined to stop the operation, the appliance control unit 10 reads a command for an operation stop request retained in the operation information storage unit 12 and transmits a control signal including the relevant command to the appliance 3 via the transmission line Ls2 in step S9. In contrast, if it is determined not to stop the operation, the appliance control unit 10 stops subsequent processes.

Then, the appliance 3 receives the control signal transmitted via the transmission line Ls2 by the control signal reception unit 31 and transfers a command included in the control signal to the control unit 30. The control unit 30 controls the execution unit 32 in compliance with the command to stop the predetermined operation of the execution unit 32 in step S10. That is, in the case where the amount of the surplus power generated by the photovoltaic power generation unit 100 is less than the power consumption of the appliance 3 that executes a predetermined operation, if the appliance 3 continues the execution of the predetermined operation, power needs to be purchased (fed) from the electric power system W1 of the power purchasing-side power provider. In such a case, since a power is not saved, the predetermined operation of the appliance 3 is immediately stopped.

As described above, in accordance with the power control system in the present embodiment, the surplus power is consumed by allowing one or more appliances 3 to execute predetermined operations. This results in the advantage that a surplus portion of a power generated by the self-generated electrical power facility, such as a photovoltaic power system or the like, can be efficiently consumed, thus promoting power savings.

In this case, the surplus power information transmission unit 2 in the present embodiment detects the generation of the surplus power based on whether or not the power conditioner 101 executes the suppressing of voltage rise, but the method of detecting a surplus power is not limited thereto. For example, when a notification (message) indicating the stoppage of power selling is sent from the power selling-side power provider to the appliance control device 1 over a data communications network, such as the Internet, the generation of the surplus power can be detected based on the corresponding notification, the amount of the power generated by the photovoltaic power generation unit 100, and the power consumption of the appliance 3.

Second Embodiment

A power control system in accordance with a second embodiment of the present invention is characterized in that a device consuming the surplus power is a chargeable appliance 3' having a secondary cell (e.g., a nickel metal hydride battery, a lithium-ion battery or the like) as a power source, and in that an appliance control device 1 controls charging of the secondary cell provided in the chargeable appliance 3'. However, since the basic configuration of the power control system of the present embodiment is common to that of the first embodiment, the common components will be designated by like reference symbols with no illustration or description made thereon.

Figure 3:
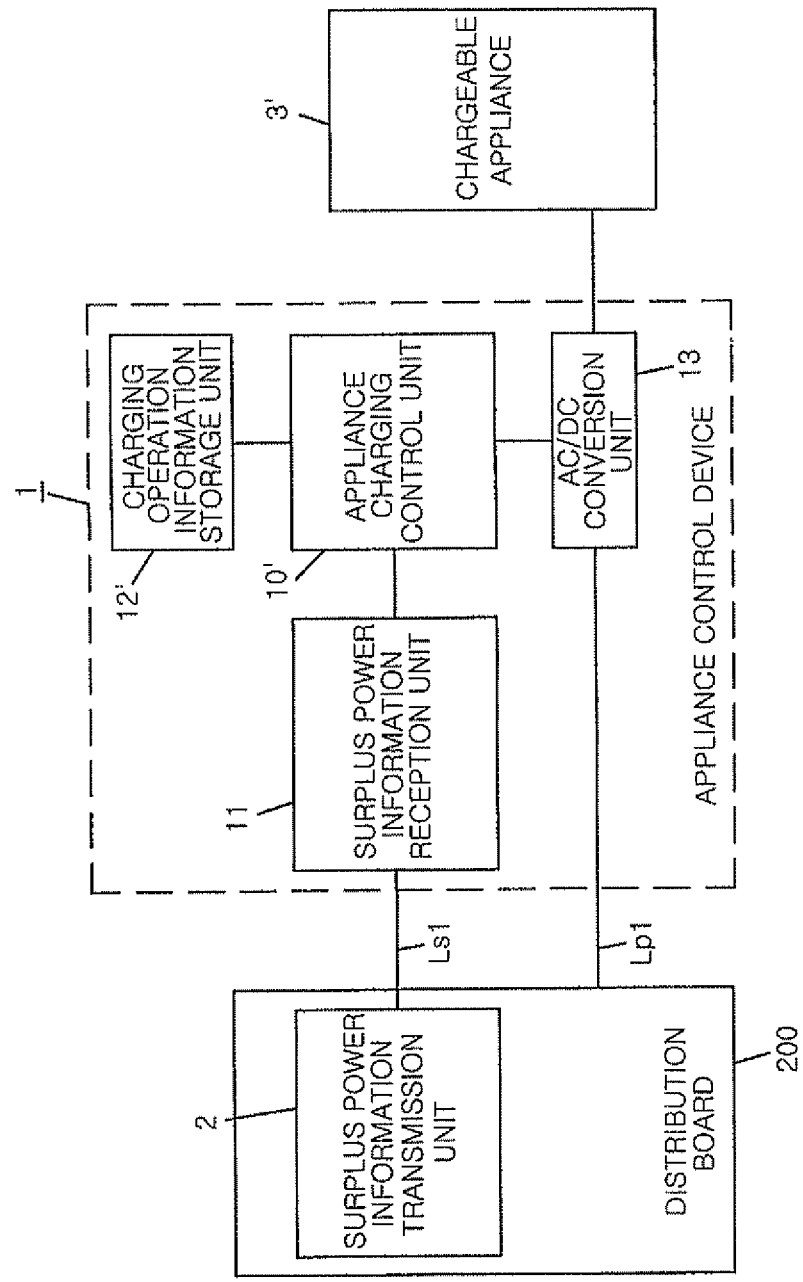
FIG. 3 is a block diagram showing an appliance control device in a power control system in accordance with a second embodiment of the present invention.

As shown in FIG. 3, the appliance control device 1 in the present embodiment includes a surplus power information reception unit 11 for receiving surplus power information transmitted from a surplus power information transmission unit 2 via a transmission line Ls1, a charging operation information storage unit 12' for retaining (storing) charging operation information on the chargeable appliance 3', an AC/DC conversion unit 13 for converting an AC power fed via a power line Lp1 into a DC power and supplying the DC power to the chargeable appliance 3', and an appliance charging control unit 10' for controlling the AC/DC conversion unit 13.

In this case, the charging operation information retained in the charging operation information storage unit 12' is information required to control the charging operation of the chargeable appliance 3' that is a target to be controlled, and specifically includes information, such as an internal command for starting or stopping the operation of the AC/DC conversion unit 13 or an internal command for adjusting an output voltage and an output current, and a voltage value and current value of a DC power required to charge the secondary cell of the chargeable appliance 3'.

Therefore, when the surplus power information reception unit 11 receives the surplus power information from the surplus power information transmission unit 2 and transfers the surplus power information to the appliance charging control unit 10', the appliance charging control unit 10' compares the amount of the surplus power included in the surplus power information with the amount of a power required to charge the secondary cell of the chargeable appliance 3' (amount of charging power) which is included in charging operation information retained in the charging operation information storage unit 12'.

If the amount of the surplus power is greater than the amount of the charging power, the appliance charging control unit 10' assigns the internal command read from the charging operation information storage unit 12' to the AC/DC conversion unit 13 so that the AC/DC conversion unit 13 executes an AC/DC conversion operation. In contrast, if the amount of the surplus power is less than the amount of the charging power, the appliance charging control unit 10' stops subsequent processes.

Further, when the AC/DC conversion unit 13 starts to perform the AC/DC conversion operation in compliance with the internal command, the surplus power (AC power) fed via the power line Lp1 is converted into a DC power and is used (consumed) in the charging operation of the chargeable appliance 3'. However, similarly to the first embodiment, when the amount of the surplus power is changed and becomes less than the amount of the charging power, the appliance charging control unit 10' assigns the internal command to the AC/DC conversion unit 13 to stop the AC/DC conversion operation.

As described above, in accordance with the power control system in the present embodiment, the secondary cell of the chargeable electric device 3' is charged by using the surplus power, thus enabling the surplus power to be efficiently consumed. Further, control performed by the appliance control device 1 in the first embodiment is executed by the appliance control device 1 in the present embodiment.

In detail, when the operation information that was retained in the operation information storage unit 12 of the appliance control device 1 in first embodiment is retained in the charging operation information storage unit 12' of the appliance control device 1 in the present embodiment, and the appliance charging control unit 10' further performs processes that were executed by the appliance control unit 10 of the appliance control device 1 in first embodiment, it is possible for the surplus power to be consumed by allowing the appliance 3 to execute the predetermined operation while the surplus power is also consumed by allowing the chargeable appliance 3' to execute the charging operation.

Third Embodiment

Figure 5:
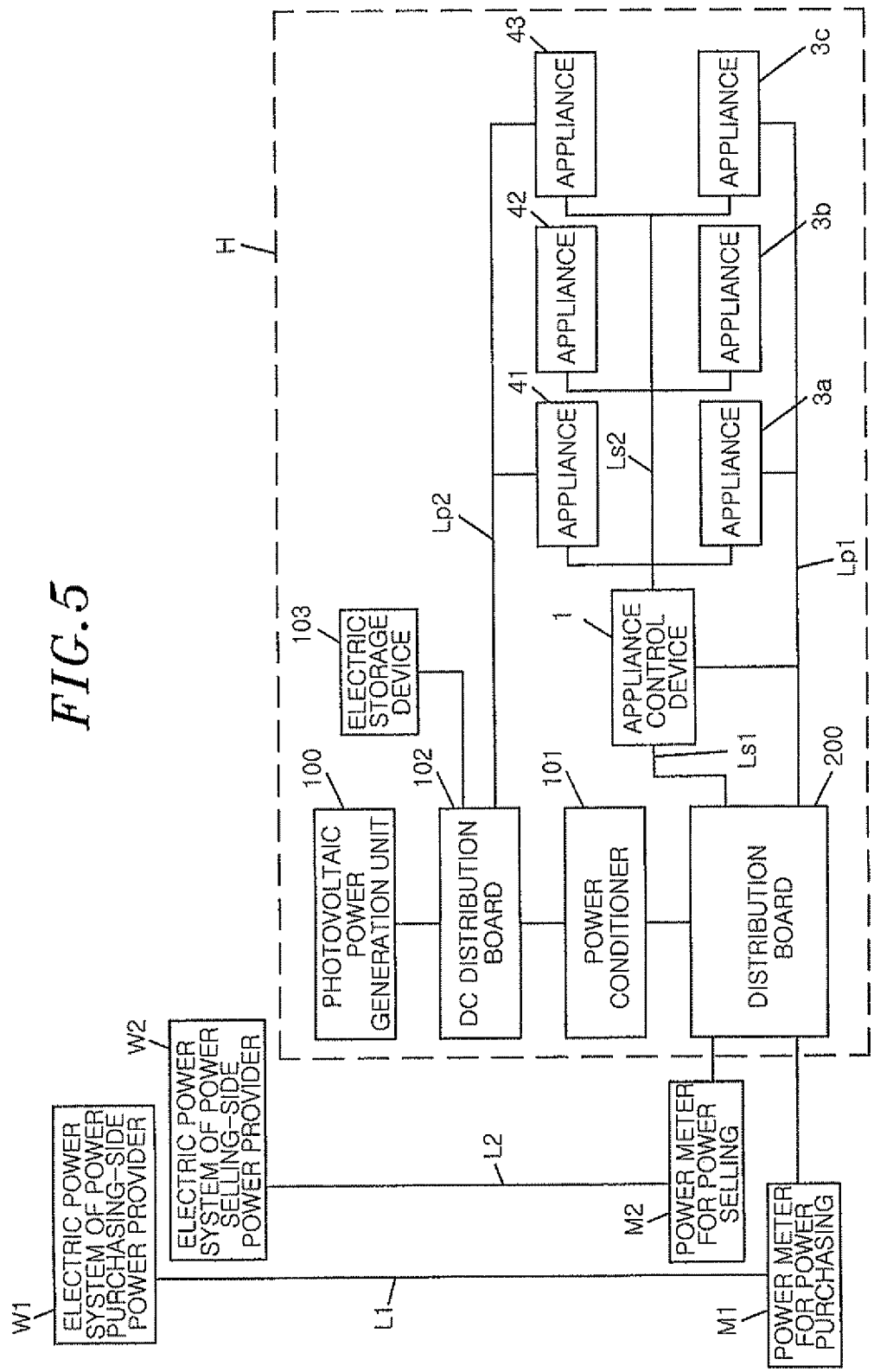
FIG. 5 is a system configuration diagram showing the above power control system.

As shown in FIG. 5, a power control system in accordance with a third embodiment of the present invention is different from the power control system in the first embodiment in that it includes a electric storage device 103 for storing a DC power (i.e., accumulating electricity) generated by a photovoltaic power generation unit 100, a DC distribution board 102 for individually distributing the DC power generated by the photovoltaic power generation unit 100 to the electric storage device 103, a DC distribution line Lp2 in a house H, and a power conditioner 101, and DC appliances 4 (41 to 43) for using (consuming) the DC power supplied (fed) via the DC distribution line Lp2. However, the same reference numerals are assigned to components common to those of the power control system in the first embodiment, and a description thereof is omitted.

Herein, the power conditioner 101 in the present embodiment includes an AC/DC converter (not shown) for converting AC power supplied from the electric power system W1 of a power purchasing-side power provider via a distribution board 200 into a DC power, as well as an inverter for converting the DC power generated by the photovoltaic power generation unit 100 into an AC power. Further, the DC power converted by the AC/DC converter of the power conditioner 101 is supplied from the DC distribution board 102 to the DC appliances 4 via the DC distribution line Lp2.

The electric storage device 103 includes, e.g., a lead-acid battery and a protection device for protecting the lead-acid battery from overcharging or over-discharging. The DC distribution board 102 includes a DC breaker (not shown) for separating the photovoltaic power generation unit 100 from the power conditioner 101 and separating the electric storage device 103 from the DC distribution line Lp2.

Each of the DC appliances 4 has components (a control unit, a control signal reception unit, and an execution unit) that are common to the appliance 3 for AC power shown in FIG. 1, except that the using power thereof is a DC power, and thus the illustration and description of detailed configuration of each of the DC appliances 4 are omitted.

The power control system in accordance with the present embodiment basically supplies a power generated by the photovoltaic power generation unit 100 from the DC distribution board 102 to the DC appliances 4 via the DC distribution line Lp2 while supplying the power to appliances 3 (3a to 3c) for AC power via the distribution board 200. The power control system charges the electric storage device 103 when the generated power is greater than the power consumed by the appliances 3 and the DC appliances 4. Further, a surplus portion of the generated power, which exceeds the storage capacity of the electric storage device 103, is sold (reversely supplied) to the electric power system W2 of the power selling-side power provider.

When the amount of power consumed by the appliances 3 and the DC appliances 4 is greater than the amount of power generated by the photovoltaic power generation unit 100 and the amount of the power stored in the electric storage device 103, the power control system feeds the power, supplied (purchased) from the electric power system W1 of the power purchasing-side power provider, to the appliances 3 via the distribution board 200 as well as feeding the power to the DC appliances 4 via the power conditioner 101 and the DC distribution board 102.

Herein, the power generated by the photovoltaic power generation unit 100, the power stored in the electric storage device 103, and the power consumed by the DC appliances 4 can be detected by the DC distribution board 102, and the power consumed by the appliances 3 can be detected by the distribution board 200. The DC distribution board 102 transfers the detected information to the distribution board 200, so that the distribution board 200 can calculate the surplus power in the house H. Further, although the number of the appliances 3 for AC power and the number of the DC appliances 4 are shown as being only three respectively in FIG. 5, the numbers are not limited to those.

Figure 4:
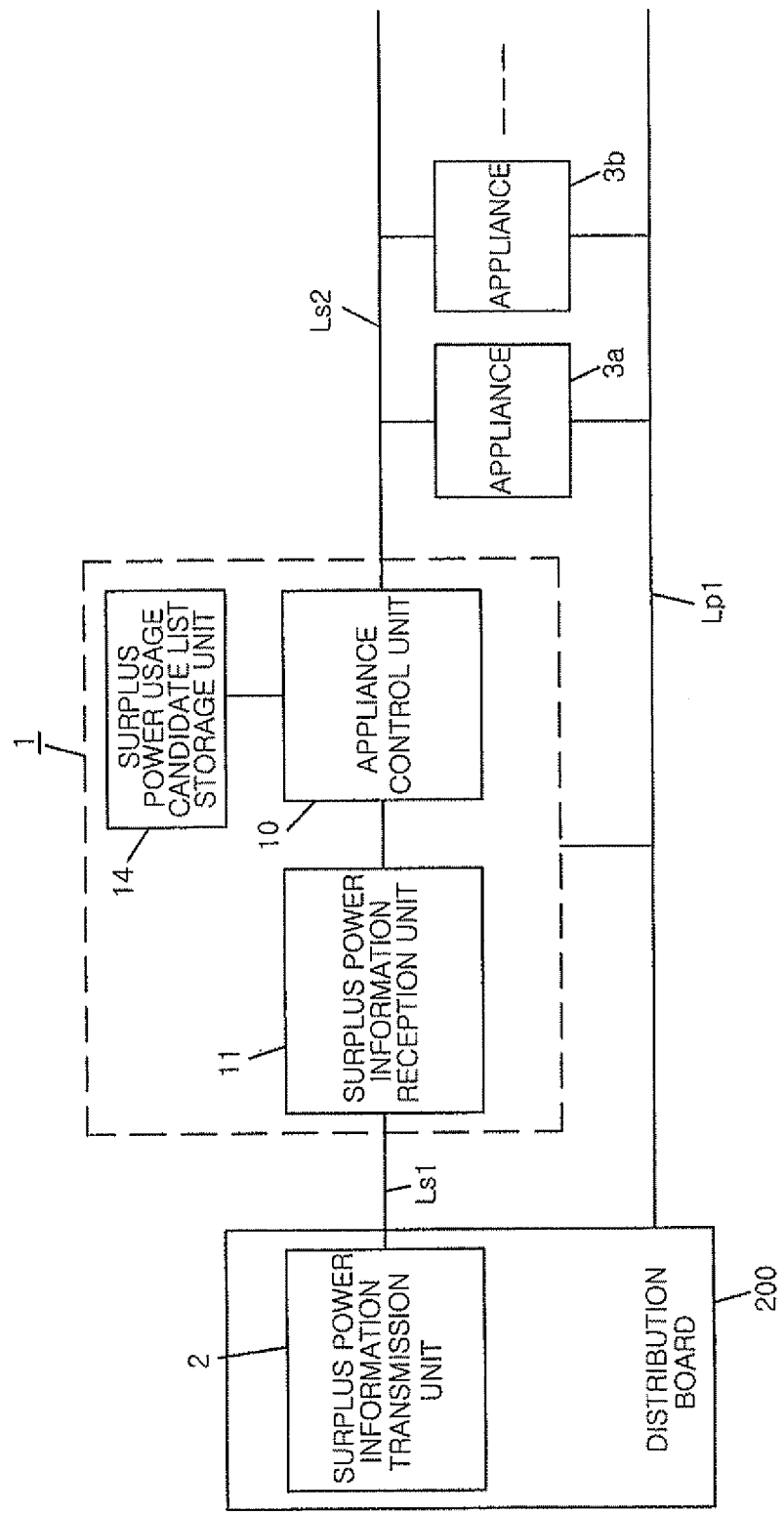
FIG. 4 is a block diagram showing an appliance control device in a power control system in accordance with a third embodiment of the present invention.

Further, as shown in FIG. 4, the appliance control device 1 of the present embodiment is identical to the appliance control device 1 of the first embodiment in that the appliance control unit 10 and the surplus power information reception unit 11 are provided. However, the appliance device 1 is different from that of the first embodiment in that, instead of the operation information storage unit 12, a surplus power usage candidate list storage unit 14 for retaining a list of surplus power usage candidates is provided. Further, in FIG. 4, the illustration of the DC appliances 4 is omitted.

The surplus power usage candidate list storage unit 14 is implemented with a rewritable non-volatile semiconductor memory (e.g., a flash memory or the like) similarly to the operation information storage unit 12. The surplus power usage candidate list retained in the surplus power usage candidate list storage unit 14 is a list including information required to control the appliances 3 (3a to 3c) and DC appliances 4 (41 to 43) that are targets to be controlled. Specifically, the surplus power usage candidate list is a list in which IDs of respective appliances 3a to 3c and those of the DC appliances 41 to 43 are correlated with commands for starting or stopping the predetermined operations of the appliances 3a to 3c and the DC appliances 41 to 43 and the amounts of power consumption of the appliances 3a to 3c and DC appliances 41 to 43 when the corresponding operations are performed.

Next, the operation of the power control system in accordance with the present embodiment will be described. When the surplus power information reception unit 11 receives the surplus power information from the surplus power information transmission unit 2 and transfers it to the appliance control unit 10, the appliance control unit 10 selects a combination of the appliances 3 and the DC appliances 4 that can most efficiently use the surplus power, on the basis of information on the amount of surplus power included in the surplus power information and on amounts of the power consumptions of the appliances 3a to 3c and the DC appliances 41 to 43 that are included in the surplus power usage candidate list retained in the surplus power usage candidate list storage unit 14.

More specifically, the appliance control unit 10 primarily determines whether the amount of surplus power exceeds a minimum amount of the power consumption in the surplus power usage candidate list, and stops subsequent processes if the amount of surplus power does not exceed the minimum amount of power consumption. Further, if the amount of surplus power exceeds the minimum amount of power consumption in the surplus power usage candidate list, the appliance control unit 10 selects a combination of the appliances 3 and the DC appliances 4 of which the sum of power consumptions is equal to or less than the amount of surplus power and differs least from the amount of surplus power, among the individual appliances 3 and the DC appliances 4 included in the surplus power usage candidate list. Further, the appliance control unit 10 transmits a control signal, which includes a command for an operation start request read from the surplus power usage candidate list storage unit 14 and in which the identification codes (ID codes) of the respective appliances 3 and DC appliances 4 are set in a destination address, to the transmission line Ls2 in order to allow the selected appliances 3 and DC appliances 4 to individually start predetermined operations.

Each of the appliances 3 and DC appliances 4 executes a predetermined operation in compliance with the command included in the control signal only when the ID code set in the destination address of the control signal is identical to its own ID code. In this case, each of the DC appliances is supplied with the surplus power of the photovoltaic power generation unit 100 via the DC distribution line Lp2. Meanwhile, each of the appliances 3 is supplied with AC power via the power line Lp1 after the surplus power of the photovoltaic power generation unit 100 has been converted into the AC power by the power conditioner 101.

As described above, in the power control system in the present embodiment, even if the amount of surplus power is greater than the total amount of powers consumed by individual appliances 3 and DC appliances 4, the appliance control unit 10 selects a combination of the appliances 3 and DC appliances 4, of which the sum of the power consumptions does not exceed the amount of surplus power, as power usage candidates, and allows the plurality of selected appliances 3 and DC appliances 4 to execute predetermined operations, thus more efficiently using the surplus power without any waste of power.

Fourth Embodiment

Since a basic system configuration of a power control system in accordance with a fourth embodiment of the present invention is common to that of the third embodiment 3 (refer to FIG. 5), the same reference numerals are assigned to common components, and the illustration and description thereof will be omitted.

Figure 6:
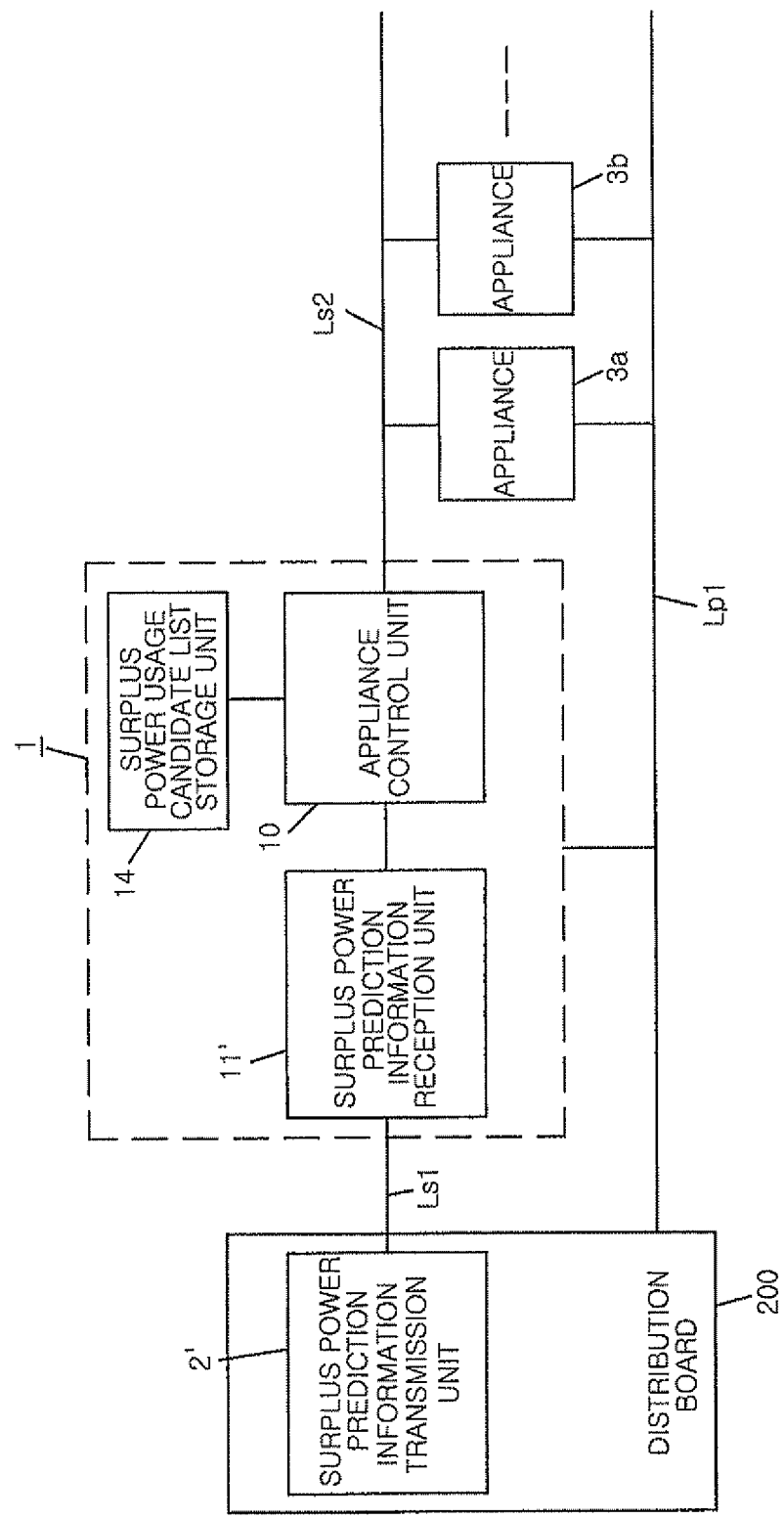
FIG. 6 is a block diagram showing an appliance control device in a power control system in accordance with a fourth embodiment of the present invention.

In the present embodiment, as shown in FIG. 6, a surplus power prediction information transmission unit 2' is provided in a distribution board 200 and is configured to transmit both surplus power prediction information and surplus power information indicative of an actually generated surplus power to an appliance control device 1 via a signal line (transmission line) Ls1. The surplus power prediction information is obtained by predicting the time at which the surplus power is generated and the amount of the surplus power, on the basis of the amount of the power generated by a photovoltaic power generation unit 100 and a demand for the power.

The surplus power prediction information transmission unit 2' predicts the time at which the surplus power is estimated to be generated in the individual time slots of a day (e.g., time slots corresponding to every one or several hours), and the amount of surplus power generated at that time, on the basis of patterns (time slots) of voltage rise suppression performed by the power conditioner 101 in a day, patterns of power generation (the amount of power generated in individual time slots) by the photovoltaic power generation unit 100, patterns of usual power consumption (the amount of powers consumed in the individual time slots) by the respective appliances 3 (also including DC appliances 4, hereafter the same as the above), and allowable residual power stored in the electric storage device 103.

However, the method of predicting the time of generation of the surplus power and the amount of the surplus power are not limited to the above method. For example, when a notification indicating the stoppage of power selling (e.g., a message indicating that power selling will be stopped from Δ time on 0 month x date) is sent from the power selling-side power provider to the appliance control device 1 over a data communications network, such as the Internet, the time at which the surplus power is generated and the amount of the surplus power can be predicted based on the relevant notification and the above-described individual patterns.

The appliance control device 1 in accordance with the present embodiment includes a surplus power prediction information reception unit 11' for receiving the surplus power prediction information and the surplus power information, which have been transmitted from the surplus power prediction information transmission unit 2' via the signal line Ls1, and for transferring the relevant information to the appliance control unit 10. Further, in the present embodiment, a surplus power usage candidate list retained in the surplus power usage candidate list storage unit 14 includes the time (activation time) taken to activate a relevant appliance 3 that is the power using candidate in a power off state (a waiting state), or a command required to activate a relevant appliance 3.

Next, the operation of the power control system in accordance with the present embodiment will be described. The surplus power prediction information reception unit 11' receives the surplus power prediction information, which has been predicted by and transmitted from the surplus power prediction information transmission unit 2', and transfers it to the appliance control unit 10. Then, the appliance control unit 10 selects a combination of the appliances 3 that can most efficiently use a surplus power (predicted value), on the basis of a predicted value for the amount of surplus power included in the surplus power prediction information and the amount of the power consumption of the appliances 3 included in the surplus power usage candidate list retained in the surplus power usage candidate list storage unit 14.

In detail, the appliance control unit 10 primarily determines whether the amount of surplus power (predicted value) exceeds the minimum amount of power consumption in the surplus power usage candidate list, and stops subsequent processes if the amount of surplus power does not exceed the minimum amount of power consumption. In contrast, if the amount of surplus power (predicted value) exceeds the minimum amount of power consumption in the surplus power usage candidate list, the appliance control unit 10 selects a combination of the appliances 3, of which sum of power consumptions is equal to or less than the amount of the surplus power (predicted value) and differs least from the amount of the surplus power (predicted value), among the individual appliances 3 included in the surplus power usage candidate list. Further, the appliance control unit 10 sends a control message, that includes an activation command, to each of the selected appliances 3 in timing prior to the surplus power generation time (the predicted time) by the activation time thereof to thereby activate the selected appliance 3 before the corresponding predicted time.

Further, when the surplus power prediction information transmission unit 2' actually detects the generation of the surplus power and sends the surplus power information, the appliance control unit 10 that receives the surplus power information via the surplus power prediction information reception unit 11' transmits a command for an operation start request, which is read from the surplus power usage candidate list storage unit 14, to the individual one of the appliances 3 that have been selected. Then, the appliances 3 having received the command execute the predetermined operations by using (consuming) the surplus power.

Therefore, the power control system in accordance with the present embodiment is advantageous in that the surplus power generation time and the amount of the surplus power are predicted and the appliances 3 are previously activated correspondingly to the time at which the surplus power is generated, thus more efficiently using the surplus power.

Fifth Embodiment

Figure 7:
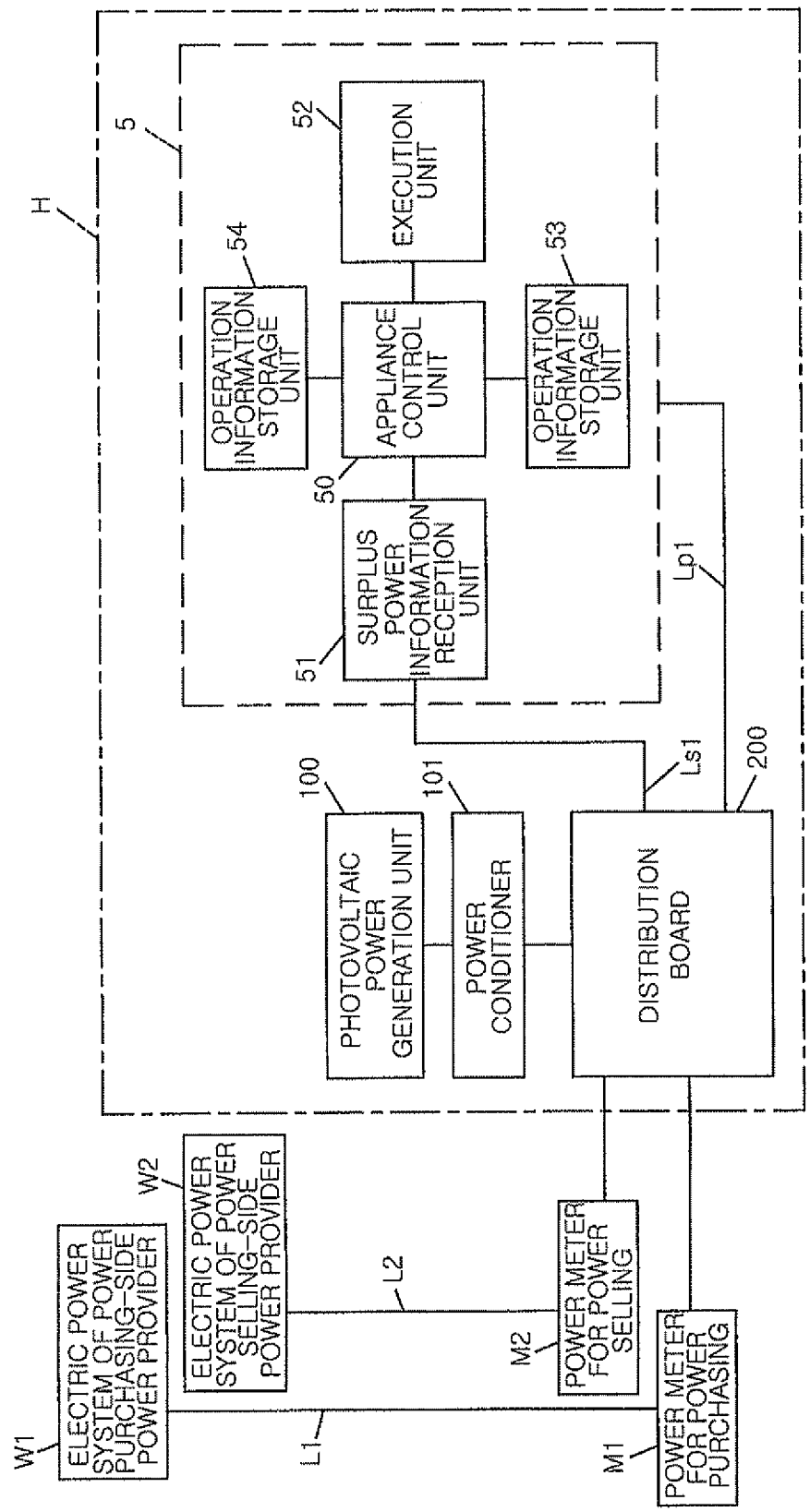
FIG. 7 illustrates a block diagram showing an electric device and a system configuration diagram of a power control system including the electric device in accordance with a fifth embodiment of the present invention.

A fifth embodiment of an electric device in accordance with the present invention will be described. FIG. 7 illustrates a configuration of a power control system including an electric device 5 in accordance with the present embodiment. In the power control system of present invention, the same reference numerals are assigned to components common to those of the power control system of the first embodiment, and the illustration and description thereof will be omitted.

The electric device 5 includes a control unit 50 having a microcomputer as its principal component, a surplus power information reception unit 51, an execution unit 52 for executing a predetermined operation, an operation information storage unit 53 implemented as rewritable non-volatile semiconductor memory, such as a flash memory, and a switch manipulation unit 54. The surplus power information reception unit 51 receives surplus power information transmitted from a surplus power information transmission unit 2 installed in a distribution board 200 via a signal line Ls1.

The control unit 50 receives the surplus power information from the surplus power information reception unit 51 and performs the control of assigning an internal command to the execution unit 52 to start or stop a predetermined operation (hereinafter, referred to as "automatic control upon the generation of surplus power") on the basis of the surplus power information and operation information retained (stored) in the operation information storage unit 53. In this case, the term operation information retained in the operation information storage unit 53 refers to information, such as an internal command for allowing the execution unit 52 to start or stop a predetermined operation and the amount of the power consumed when a relevant operation is executed.

However, when the operation executed by the execution unit 52 by using the automatic control upon the generation of surplus power is an operation programmed such that the control unit 50 prompts the operation to be executed by the execution unit 52 at every scheduled time set with a predetermined interval, information, such as the scheduled time at which the relevant operation is to be executed, the time taken to execute the relevant operation or the like is also included in the operation information.

Further, the "predetermined operation" may include, e.g., a defrosting operation or a ice-making operation when the electric device 5 is a refrigerator or may include a cooling or heating operation performed so that room temperature is maintained at a set temperature or an operation of cleaning an internal filter or an internal fan when the electric device 5 is air-conditioning equipment (air conditioner). The "predetermined operation" may further include an operation of purifying air within the room or an operation of cleaning an internal filter or the like when the electric device 5 is an air cleaner or may include an error checking operation or a defragmentation operation performed on a storage device, such as a hard disk device, when the appliance 3 is a personal computer.

The switch manipulation unit 54 has a human-manipulatable switch, such as a dip switch or a push-button switch. The switch manipulation unit 54 receives a manipulation input required to switch the validity/invalidity of automatic control upon the generation of surplus power by means of the manipulation of the switch and outputs the manipulation input to the control unit 50. That is, when the switch manipulation unit 54 receives a manipulation input that causes the automatic control upon the generation of surplus power to be valid, the operation mode of the control unit 50 is set to be ON, whereas when the switch manipulation unit 54 receives a manipulation input that causes the automatic control upon the generation of surplus power to be invalid, the operation mode of the control unit 50 is set to be OFF.

When the operation mode is set to be OFF, the control unit 50 performs no automatic control upon the generation of surplus power even when surplus power information is received from the surplus power information reception unit 51. However, although the operation mode is set to be OFF, when the operation executed by the execution unit 52 by using the automatic control upon the generation of surplus power is the programmed one to be executed by the execution unit 52 at the scheduled time, as described above (e.g., the defrosting operation of a refrigerator or the cleaning of an air conditioner and the like), the control unit 50 allows the execution unit 52 to execute the predetermined operation by assigning an internal command to the execution unit 52 at the scheduled time.

Meanwhile, when the operation mode is set to be ON, the control unit 50 performs the automatic control upon the generation of surplus power when the surplus power information is received from the surplus power information reception unit 51. In detail, when the amount of the surplus power included in the surplus power information is greater than an amount of power consumption included in the operation information retained in the operation information storage unit 53, the control unit 50 starts a predetermined operation by assigning an internal command to the execution unit 52. In contrast, when the amount of surplus power is less than the amount of the power consumption, the control unit 50 stops the process of relevant automatic control without assigning the internal command. When the internal command for starting the predetermined operation is received from the control unit 50, the execution unit 52 executes the predetermined operation by using (consuming) the surplus power fed via the power line Lp1.

In this regard, in the case where the operation to be executed by the execution unit 52 by using the automatic control upon the generation of surplus power is the programmed one to be executed by the execution unit 52 at a scheduled time, as described above (e.g., the defrosting of a refrigerator, the filter cleaning of an air conditioner or the like), if the above operation is executed by the execution unit 52 at a time other than the scheduled time due to the generation of surplus power, the control unit 50 preferably determines new scheduled time with regular interval by setting the time at which the automatic control is performed as a starting point. Then, the initially scheduled times are changed with the newly determined scheduled times. That is, since it is sufficient to execute the defrosting of the refrigerator or the filter cleaning of the air conditioner at prescribed intervals, unnecessary power is consumed if such an operation is executed at intervals shorter than the prescribed intervals.

As described above, in the electric device 5 in accordance with the present embodiment, when a surplus power is generated, it is consumed by having the execution unit 52 to execute a predetermined operation, thus enabling the surplus power generated by the self-generated electrical power facility, such as the photovoltaic power system or the like, to be efficiently consumed and promoting power savings.

Sixth Embodiment

A sixth embodiment of an electric device in accordance with the present invention will be described. Since the configuration of a power control system including an electric device 5 in accordance with the present embodiment is common to that of the fifth embodiment, the same reference numerals are assigned to common components and the illustration and description thereof will be omitted.

Figure 8:
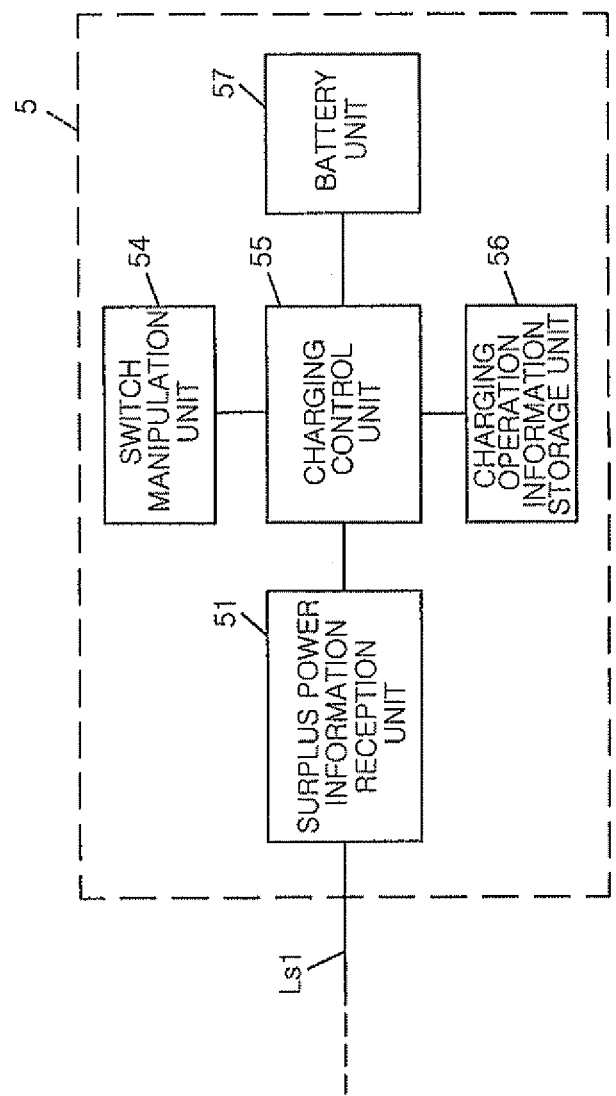
FIG. 8 is a block diagram showing an electric device in accordance with a sixth embodiment of the present invention.

The electric device 5 in accordance with the present embodiment is a device operated by using a secondary cell as a power source, such as a DMP (Digital Music Player), an electric razor, an electric toothbrush or the like. As shown in FIG. 8, the electric device 5 includes a battery unit 57 including a secondary cell and a charging circuit for the secondary cell, a charging control unit 55 for controlling the charging circuit of the battery unit 57 to start or to stop charging, a charging operation information storage unit 56 for storing information required to control the charging of the battery unit 57 (charging operation information), and an execution unit (not shown), in addition to a surplus power information reception unit 51 and a switch manipulation unit 54. Further, the execution unit is configured to execute the principal function of the electric device 5, e.g., the function of reading music data stored in a storage medium and converting the music data into electrical signals in the case of the DMP, the function of driving a razor blade in the case of the electric razor, and the function of vibrating a brush in the case of the electric toothbrush.

With this regard, the charging operation information retained in the charging operation information storage unit refers to information used to control the charging operation of the battery unit 57, and specifically means information on an internal command for allowing the charging circuit of the battery unit 57 to start or to stop the charging operation, or the amount of power required for charging. Further, in the present embodiment, the charging control unit 55 has an automatic charging function of causing the charging circuit of the battery unit 57 to start charging when the residual capacity of the secondary cell is less than a predetermined threshold value. The relevant threshold value is retained in the charging operation information storage unit 56 as two types of threshold values including a first threshold value near to a value of full charging and a second threshold value almost corresponding to the amount of power consumption of one use of the electric device 5.

When the operation mode is set to be OFF by the switch manipulation unit 54, the charging control unit 55 does not allow the battery unit 57 to automatically execute a charging operation in response to simply receiving the surplus power information from the surplus power information reception unit 51. The charging control unit 55 allows the battery unit 57 to execute a charging operation only when the residual capacity of the secondary cell is less than the first threshold value.

In contrast, when the operation mode is set to be ON, the charging control unit 55 does not cause the battery unit 57 to execute a charging operation only by using the fact that the residual capacity of the secondary cell is less than the first threshold value. In this case, when the surplus power information is received from the surplus power information reception unit 51, the charging control unit 55 assigns the internal command to the battery unit 57 to start a charging operation if the amount of surplus power included in the surplus power information is greater than the amount of the power consumption included in the charging operation information retained in the charging operation information storage unit 56. In contrast, if the amount of surplus power is less than the power consumption, the charging control unit 55 stops subsequent processes without assigning an internal command.

In the battery unit 57, when the internal command for starting the charging operation is received from the charging control unit 55, the charging circuit charges the secondary cell by using (consuming) the surplus power fed via the power line Lp1. Further, even in this case, it is apparent that when the residual capacity of the secondary cell is less than the second threshold value, the charging control unit 55 causes the battery unit 57 to execute the charging operation.

As described above, in the electric device 5 in the present embodiment, the secondary cell of the battery unit is charged with the surplus power, thus enabling the surplus power to be efficiently consumed. Further, when the control unit 50, the execution unit 52, and the operation information storage unit 53 described in the fifth embodiment are provided in the electric device 5 in the present embodiment, the surplus power can be used not only to charge the secondary cell but also to execute predetermined operations using the execution unit 52, thus enabling the efficient use of the surplus power.

In the first to sixth embodiments described above, although it has been described that the electric power system W1 of the power purchasing-side power provider and the electric power system W2 of the power selling-side power provider feed a power to the house H via their own dedicated power lines L1 and L2, parts or all of the power lines L1 and L2 may be shared in common between the two electric power systems W1 and W2. Further, in the first to sixth embodiments, although the power purchasing-side power provider and the power selling-side power provider have been described as being separate power providers, they may be the same power provider. In that case, the power meter M1 for power purchasing and the power meter M2 for power selling are connected in series with a power line used in common to purchase and sell the power.

Further, in the above embodiments, although a house has been used to exemplify the place to which the power control system is applied, the place is not limited to this example, and the power control system can be installed in and applied to apartments, such as mansions, offices or the like in office buildings.

Other Modifications

Although the present invention has been described as in the above embodiments, it is apparent that the present invention is not limited thereto. The following cases are also included in the present invention.

(1) The appliance control device includes, in detail, a computer system including a microprocessor, Read Only Memory (ROM), Random Access Memory (RAM), a hard disk unit, a display unit, a keyboard, a mouse or the like. The RAM or hard disk unit stores a computer program. The microprocessor is operated by the computer program, and the appliance control device carries out the functions of the program. The computer program is implemented by combining a plurality of instruction codes indicative of instructions related to the computer so as to carry out predetermined functions. Further, each device is not limited to the computer system including all of a microprocessor, ROM, RAM, a hard disk unit, a display unit, a keyboard, a mouse or the like and may be a computer system including some of them.

(2) Some or all of the components forming the appliance control device may be implemented as a single system LSI (Large Scale Integration). A system LSI is an ultra-multifunctional LSI manufactured by integrating a plurality of components on a single chip, and is, in particular, a computer system including a microprocessor, ROM, RAM and the like. The RAM stores a computer program. The microprocessor is operated by the computer program, so that the system LSI achieves the functions thereof.

Further, each part of components included in the appliance control device may be implemented as a single chip or may be implemented as a single chip to include some or all of the components.

Furthermore, although referred to as a system LSI here, the circuit may also be referred to as an Integrated Circuit (IC), LSI, super LSI or ultra LSI depending on the difference in the degree of integration. Further, the technique of integrated circuit implementation is not limited to LSI and may be implemented as a dedicated circuit or a general-purpose processor. A Field Programmable Gate Array (FPGA) enabling programming after the manufacture of an LSI, or a reconfigurable processor enabling the connection or setting of circuit cells in the LSI to be reconfigured, may be used.

Furthermore, if integrated circuit implementation technique replacing an LSI appears thanks to other technologies that develop or are derived from semiconductor technology, it is apparent that the integration of functional blocks may be achieved using such technique. There may be a possibility for bio-technology to be applied.

(3) Some or all of the components included in the appliance control device may be implemented as an IC card or a single module that is attachable to and detachable from each device. The IC card or the module is a computer system including a microprocessor, ROM, RAM or the like. The IC card or the module may include the above ultra-multifunctional LSI. The microprocessor is operated by the computer program, so that the IC card or the module carries out the function thereof. The IC card or the module may have anti-tamper characteristics.

(4) The present invention also includes a power control method that can efficiently consume a surplus power generated by a self-generated electrical power facility. The present invention includes a computer program in which the above method is implemented by a computer, and also includes a digital signal implemented as the computer program.

Further, the present invention includes a storage medium from which the computer program or the digital signal can be read by the computer, e.g., a flexible disk, a hard disk, Compact Disk-ROM (CD-ROM), a Magneto-Optical (MO) drive, a Digital Versatile Disk (DVD), DVD-ROM, DVD-RAM, a Blur-ray Disk (BD), semiconductor memory or the like. Further, the present invention also includes the digital signal stored in the storage medium.

Further, the present invention may transmit the computer program or the digital signal over a network representing a telecommunications line, a wireless or wired communications line or the Internet, or via data broadcasting.

Further, the present invention is a computer system provided with a microprocessor and memory, wherein the memory may store the computer program and the microprocessor may be operated in accordance with the computer program.

Further, the program or the digital signal may be executed by different independent computer systems by storing in the storage medium and transferring it, or transferring it via the network or the like.

(5) It may be possible to individually combine the above embodiments and the modifications.

In accordance with the present invention, a power control system and electric device capable of efficiently consuming a surplus portion of power generated by a self-generated electrical power facility, such as a photovoltaic power system.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A power control system configured to control electric appliances to consume a power generated by a self-generated electrical power facility using a natural energy, comprising:
   a surplus power detection unit for detecting a surplus power generated by the self-generated electrical power facility; and
   an appliance control unit for controlling operations of the electric appliances,
   wherein the appliance control unit performs a control such that when the surplus power detection unit detects the surplus power, one or more of the electric appliances respectively execute predetermined operations and consume the surplus power,
   wherein the power control system further comprises a surplus power prediction unit for predicting a time at which the surplus power is generated and an amount of the surplus power, based on an amount of a power generated by the self-generated electrical power facility and a demand for the power, and
   wherein the appliance control unit activates said one or more of the electric appliances according to a time taken to activate each of said one or more of the electric appliances based on the time at which the surplus power is generated and the amount of the surplus power predicted by the surplus power prediction unit.

2. The power control system of claim 1, wherein the electric appliances include one or more chargeable electric appliances, each having a secondary cell as a power source, and, when the surplus power detection unit detects the surplus power, the appliance control unit performs a control such that the surplus power is supplied to the chargeable electric appliances and each of the chargeable electric appliances executes a charging operation.

3. The power control system of claim 1, further comprising an appliance information storage unit for storing information on predetermined operations that are executed by electric appliances in power usage candidates for the surplus power,
   wherein, when the surplus power detection unit detects the surplus power, the appliance control unit performs a control such that a combination of electric appliances which efficiently consumes the surplus power is selected among the power usage candidates on the basis of the information on the predetermined operations stored in the appliance information storage unit, and the selected electric appliances consume the surplus power by executing the respective predetermined operations.

4. The power control system of claim 3,
   wherein the appliance information storage unit stores information on times taken to activate the electric appliances in the power usage candidates for the surplus power, together with the information on the predetermined operations, and
   wherein the appliance control unit selects a combination of electric appliances which efficiently consume the surplus power among the power usage candidates, based on the amount of the surplus power predicted by the surplus power prediction unit, the information on the predetermined operations stored in the appliance information storage unit, and the information on the times taken to activate the electric appliances, thus activating the selected electric appliances according to a time taken to activate each of the selected electric appliances before the surplus power generation time predicted by the surplus power prediction unit, and enables the surplus power to be supplied to the selected electric appliances when the surplus power detection unit detects the surplus power to allow the electric appliances to execute the predetermined operations.

5. The power control system of claim 2, further comprising an appliance information storage unit for storing information on predetermined operations that are executed by electric appliances in power usage candidates for the surplus power, wherein, when the surplus power detection unit detects the surplus power, the appliance control unit performs a control such that a combination of electric appliances which efficiently consumes the surplus power is selected among the power usage candidates on the basis of the information on the predetermined operations stored in the appliance information storage unit, and the selected electric appliances consume the surplus power by executing the respective predetermined operations.

6. The power control system of claim 5, wherein the appliance information storage unit stores information on times taken to activate the electric appliances in the power usage candidates for the surplus power, together with the information on the predetermined operations, and wherein the appliance control unit selects a combination of electric appliances which efficiently consume the surplus power among the power usage candidates, based on the amount of the surplus power predicted by the surplus power prediction unit, the information on the predetermined operations stored in the appliance information storage unit, and the information on the times taken to activate the electric appliances, thus activating the selected electric appliances according to the times taken to activate each of the selected electric appliances before the surplus power generation time predicted by the surplus power prediction unit, and enables the surplus power to be supplied to the selected electric appliances when the surplus power detection unit detects the surplus power to allow the electric appliances to execute the predetermined operations.

\* \* \* \* \*